United States Patent [19]

Goldman

[11] 4,373,242
[45] Feb. 15, 1983

[54] METHOD OF MANUFACTURING A WEDGE GATE VALVE

[75] Inventor: Holliday L. Goldman, Red Lion, Pa.

[73] Assignee: Allis-Chalmers Corporation, Milwaukee, Wis.

[21] Appl. No.: 948,527

[22] Filed: Oct. 4, 1978

[51] Int. Cl.³ .................................. B23P 15/00; F16K
[52] U.S. Cl. .............................. 29/157.1 R; 29/463; 251/326; 251/329
[58] Field of Search ............... 29/157.1 R, 463; 251/326, 327, 366, 367, 329; 137/543.19, 543.21

[56] References Cited

U.S. PATENT DOCUMENTS

| | | | |
|---|---|---|---|
| 1,801,237 | 4/1931 | Hanson | 251/367 |
| 2,065,035 | 12/1936 | Taylor | 251/329 |
| 2,627,651 | 2/1953 | MacGregor | 29/157.1 R |
| 3,152,786 | 10/1964 | Soderberg et al. | 251/329 |
| 3,176,956 | 4/1965 | Englert et al. | 251/329 |
| 3,190,305 | 6/1965 | Schulze | 251/326 |
| 3,377,049 | 4/1968 | DeFrees | 251/329 |

FOREIGN PATENT DOCUMENTS

| | | | |
|---|---|---|---|
| 528135 | 4/1954 | France | 251/327 |
| 1109760 | 2/1956 | France | 251/326 |

*Primary Examiner*—Daniel C. Crane
*Attorney, Agent, or Firm*—Timothy R. Conrad

[57] ABSTRACT

A wedge gate valve is manufactured from plate steel which comprises machining the valve body from steel plate to provide inlet and outlet body sides which are identical and which are bolted together to form a non-cast, non-forged and non-welded gate valve particularly well suited for nuclear class service.

1 Claim, 6 Drawing Figures

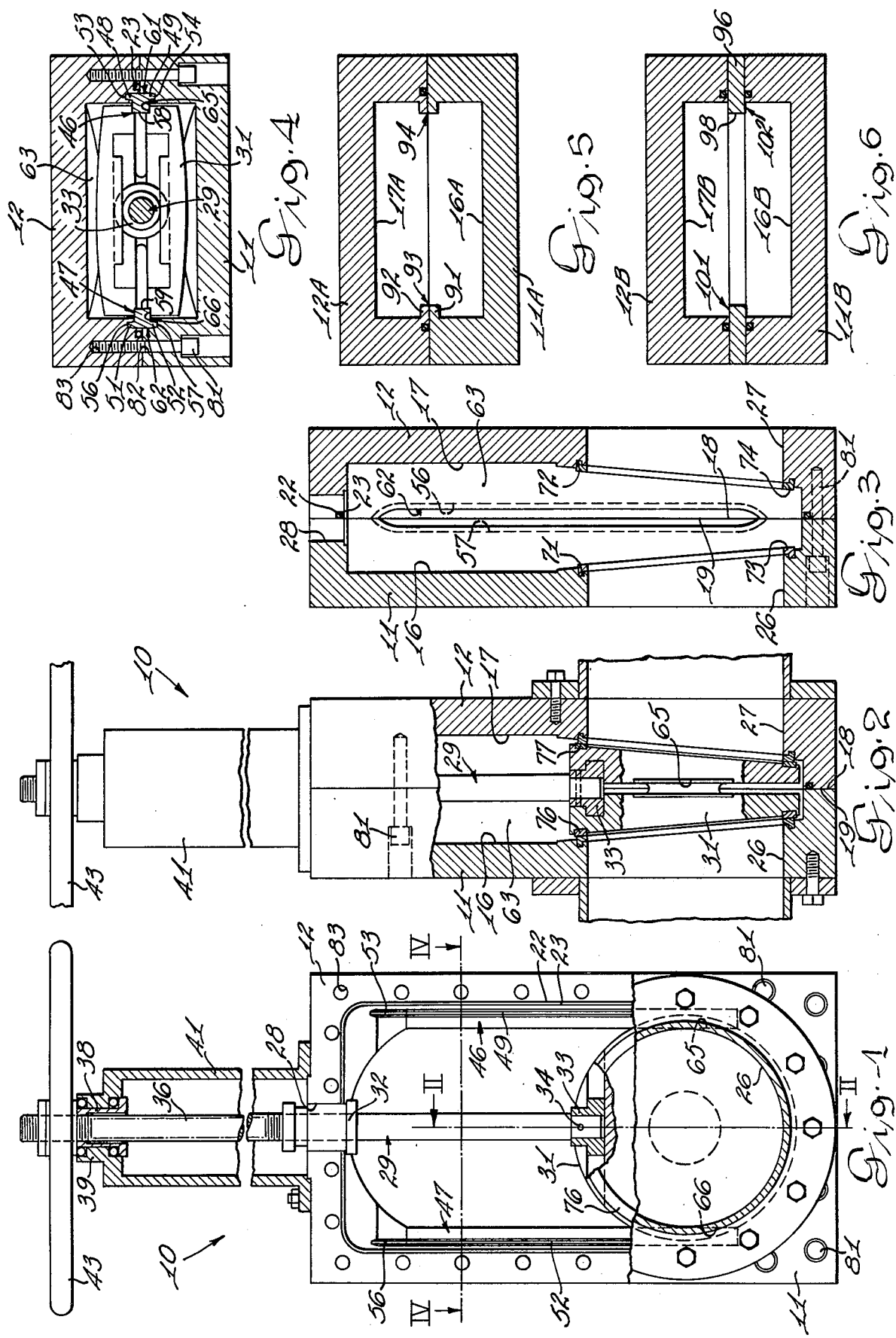

METHOD OF MANUFACTURING A WEDGE GATE VALVE

This invention relates in general to a wedge gate valve which eliminates the necessity of casting, forging or welding the valve body.

Known wedge gate valves have bodies which are usually casted, forged or welded. These known valves require specialized processing when utilized for nuclear class service. With these valves it is necessary to X-ray the body castings and in the case of forged and welded bodies they also require X-raying. As a result, the cost of manufacturing wedge gate valves for nuclear class service has been extremely high. Prior art wedge gate valves are exemplified in U.S. Pat. Nos. 3,624,882; 3,545,480; 3,260,503; 3,212,753 and 3,204,970. However, these patents do not specifically state how the valve is constructed other than general statements of casting or utilizing welding techniques.

It is the general object of the present invention to provide a wedge gate valve of simplified construction and which does not use castings, forgings or welded form.

It is a more specific object of the present invention to provide a wedge gate valve constructed so as to eliminate the need for X-ray examination of the valve.

Still another object of the present invention is to provide a wedge gate valve constructed from steel stock on which minimum machining is performed.

DESCRIPTION OF THE DRAWINGS

FIG. 1 is a view in left side elevation of the wedge gate valve of the present invention as viewed from the left in FIG. 2;

FIG. 2 is a view partly in elevation and partly in section taken in a plane represented by the line II—II in FIG. 1;

FIG. 3 is a view of the valve body with the wedge gate and guide removed;

FIG. 4 is a view in cross section taken along the line IV—IV of FIG. 1;

FIG. 5 is a view in cross section similar to FIG. 4 of a modification in the manufacture of the valve body; and FIG. 6 is a view similar to FIG. 5 of another modification in the manufacture of the valve body.

DESCRIPTION OF THE INVENTION

Referring to the drawings, a wedge gate valve 10 manufactured according to the present invention is disclosed. The valve 10 includes a valve body formed from two pieces of plate steel 11 and 12 which bolted together form the inlet and outlet sides respectively of the valve body. The plate sides 11 and 12 are of plate steel having the desired composition and thickness necessary to stand the forces which will be imposed upon in nuclear class operation. The sides 11 and 12 are identical and formed in identical manner. As shown, one side of the plates 11 and 12 are relieved as by being machined to form cavities 16 and 17, respectively. In forming the cavities 16 and 17, rim surfaces 18 and 19 are provided which are machined flat to provide a good flat face-to-face mating surface. In the rim surface 18 a continuous groove 22 is machined to receive a deformable seal member 23 which will operate to seal the joint surface between the two mated side pieces 11 and 12.

Inlet and outlet openings 26 and 27 are drilled through the inlet and outlet sides 11 and 12, respectively. The openings 26 and 27 are constructed so that their axes coincide when the sides 11 and 12 are assembled in abutting sealed relationship.

With the inlet and outlet sides 11 and 12 in assembled relationship, a stuffing box and shaft opening 28 is drilled on an axis which passes through a plane which contains the joint surface of the abutting sides. The opening 28 receives the shaft 29 of the wedge valve disc 31 which passes through a conventional stuffing box 32 disposed within the opening 28. As shown, the valve disc shaft 29 is attached to the valve disc 31 by means of a bifurcated circular fitting 33 which in cross section presents a T-shaped configuration. A pin 34 is inserted through the fitting 33 and the end of the shaft 29. At its upper end 36, the shaft 29 is threaded and extends upwardly through the stuffing box 32 and through a threaded nut 38 journalled in a boss 39 of a stabilizer frame 41. At the outer or upper end of the shaft 29, there is provided a hand wheel 43 which is drivenly connected by a key (not shown) to the nut 38. Rotation of the hand wheel 43 in a selected direction of rotation will effect movement of the valve disc 31 between an open or a closed position.

To guide the valve disc 31 in its path of movement and to prevent the valve disc from moving in a horizontal plane in any direction, there is provided guide means. The guide means are a pair of elongated bar members 46 and 47. The bar members 46 and 47 are formed with laterally extending arm portions 48 and 49 and 51 and 52, respectively. The laterally extending arms are engaged in vertical slots 53 and 54 and 56 and 57, respectively. The slots 53, 54, 56 and 57 are machined in each side portion of each of the valve body sides 11 and 12. The associated slots 53 and 54 and 56 and 57 form T-slots when the sides 11 and 12 are assembled. This permits the stem portions 58 and 59 of the bars to extend through the elongated openings 61 and 62 of the T-slots inwardly into the composite cavity or valve body recess 63 formed by the assembled sides 11 and 12.

The valve disc 31 is machined to present peripheral side grooves 65 and 66 which slidably engage on the guide bars 46 and 47. Thus, the valve disc 31 is maintained in a guided path of vertical travel and is prevented from moving in a horizontal direction.

The inner peripheral edges of the inlet and outlet openings 26 and 27 are machined to form circular seat bores 71 and 72 which receive seats 73 and 74. Valve disc seats 76 and 77 are recessed into circular grooves formed on each side of the valve disc and are positioned to engage with the seats 73 or 74, respectively, when the disc is in a closed position.

In assembling the valve 10, the seats 73 and 74 are press fitted into the seat bores 71 and 72. Thereafter, the guide bar stems 58 and 59 are inserted into the peripheral groove 61 of the valve disc 31 and the three pieces placed in position in the recess of a valve side member, for example, side 11. The arm portions 48 and 51 of the guide bars 46 and 47, respectively, are inserted into the elongated slots 53 and 56, respectively. The stuffing box 32 which has been mounted on the shaft 29 is positioned within the drill opening 28 and the lower end of the shaft connected to the disc 31. The seal 23 is inserted into the seal groove 22 and the body side 12 is then placed in mating position on the body side 11. A plurality of threaded bolts 81 are inserted into drilled openings 82 formed in the side 11 into threaded engagement in tapped blind bores 83 formed in the side 12. Thus, the sides 11 and 12 are securely joined together with the internal components accurately located within the valve body recess 63.

It is apparent that a valve of novel construction suitable for nuclear class operation has been provided. The valve is of considerable strength and rigidity and of a compact size providing adequate body cavity space to accommodate the wedge valve disc. The novel construction eliminates welds and is not a casting thus eliminating the necessity of high cost X-rays of the valve body that are required in nuclear class operation.

In FIG. 5, a modification of the valve body sides 11A and 12A are disclosed which provide integrally formed valve disc guides. As shown, the sides 11A and 12A are manufactured out of plate steel and the one side machined to form cavities 16A and 17A. In effecting the machining of the cavities 16A and 17A, the edge of the sides are undercut to form continuous inwardly extending flanges 91 and 92. With the body sides 11A and 12A secured together to form the closed valve body, the flanges 91 and 92 cooperate to form valve wedge disc guides 93 and 94.

In FIG. 6 a further modification for the valve wedge disc guides is shown. In FIG. 6 the valve body sides 11B and 12B are machined to form cavities 16B and 17B, respectively. In effecting the machining of the cavities, the peripheral edge of each side 11B and 12B remains as plain edges. A rectangular plate 96 is provided between the valve sides 11B and 12B. The plate 96 is relieved to provide a central rectangular opening 98, which opening is smaller in its width dimension than the width dimension of the central recess formed by the side members 11B and 12B when secured together. Thus, the rectangular plate 96 presents wedge disc guides 101 and 102.

The embodiments of the invention in which an exclusive property or privilege is claimed are defined as follows:

1. The method of manufacturing a wedge disc valve comprising the steps of:

forming a cavity in each of two identical rectangular pieces of solid steel plate, which cavities define a recess when the two plates are secured together in cavity communicating relationship;

forming an L-shaped groove in two parallel edge surfaces of the portion of each of the steel plates that encompasses the associated cavities therein, the L-shaped grooves in each steel plate cooperating to form two T-slots with the two steel plates in mating relationship;

forming a fluid flow opening in each rectangular piece;

attaching a wedge disc guide bar to the longitudinal edges of the two rectangular pieces to extend into the recess formed by the cavities with the two rectangular pieces mated with both of the guide bars as T-shaped members with the cross-bar of each T-shaped member being confined within associated ones of the T-slots the stem of the T-shaped guide bars extending through associated T-slots;

forming a peripheral groove in a wedge disc;

locating the wedge disc within the defined recess with its peripheral groove engaged in guideable engagement on the inwardly extending stems of the T-shaped guide bars;

forming an opening in one end of the mated steel plates in which a shaft stuffing box is located with the wedge disc operating shaft extending through the stuffing box;

attaching the shaft to the wedge disc;

forming a seal receiving groove in the edge surface of the portion of the steel plate that encompasses the cavity formed in one of the steel plates, the groove extending from one side of the stuffing box opening to the other;

inserting a resilient seal in the seal receiving groove; and securing both of the steel plates together in mating relationship with their respective cavities in communicating relationship.

* * * * *